United States Patent
Stewart et al.

(10) Patent No.: US 9,191,384 B2
(45) Date of Patent: Nov. 17, 2015

(54) MAINTAINING PRIVACY IN A MULTI-TENANT CLOUD SERVICE PARTICIPATING IN A FEDERATED IDENTITY PLATFORM

(71) Applicant: VMware, Inc., Palo Alto, CA (US)

(72) Inventors: John Stewart, Mountain View, CA (US); Shrenik Dedhia, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/928,333

(22) Filed: Jun. 26, 2013

(65) Prior Publication Data
US 2015/0007263 A1    Jan. 1, 2015

(51) Int. Cl.
G06F 12/14    (2006.01)
H04L 29/06    (2006.01)
G06F 17/30    (2006.01)

(52) U.S. Cl.
CPC ............ *H04L 63/08* (2013.01); *H04L 63/0815* (2013.01)

(58) Field of Classification Search
CPC .... H04L 63/0884; H04L 9/32; H04L 63/1491
See application file for complete search history.

(56) References Cited

U.S. PATENT DOCUMENTS

| | | | |
|---|---|---|---|
| 2009/0328216 A1* | 12/2009 | Rafalovich et al. | 726/23 |
| 2013/0111540 A1* | 5/2013 | Sabin | 726/1 |
| 2013/0160079 A1* | 6/2013 | Hebert | 726/3 |

OTHER PUBLICATIONS

Towards a Multi-Tenancy Authorization System for Cloud Services. Calero et al. IEEE(2010).*
Automating the Generation of Fake Documents to Detect Network Intruders. Whitham. IJCSDF(Mar. 2013).*
Assessing the Risks and Opportunities of Cloud Computing- Defining Identity Management Systems and Maturity Models. PalsonKennedy et al. IEEE(2010).*
Protect Sensitive Data in Publoc Cloud From an Theft Attack and detect Abnormal Client Behavior. Alsaidi. IJESC(2014).*
Unknown, "SAML 2.0", accessed at <<http://en.wikipedia.org/wiki/SAML_2.0#Web_Browser_SSO_Profile>>, Wikipedia, accessed Apr. 1, 2013, 25 pages.
Unknown, "VMware Unveils Industry's Most Comprehensive Cloud Infrastructure and Management Solution", accessed at <<http://www.vmware.com/company/news/releases/vmw-vmworld-vcloud-suite-082712.html>>, VMware News Releases, VMware, Inc., Aug. 27, 2012, 3 pages.
Unknown, "OpenID", accessed at <<http://en.wikipedia.org/wiki/OpenID>>, Wikipedia, accessed Apr. 12, 2013, 12 pages.
Unknown, "VMware Announces General Availability of VMware vCloud Suite 5.1", accessed at <<http://www.vmware.com/company/news/releases/vmw-vcloud-suite-ga-091112.html>>, VMware News Releases, VMware, Inc., Sep. 11, 2012, 2 pages.
Unknown, "OASIS Standard", accessed at <<http://docs.oasis-open.org/security/saml/v2.0/>>, OASIS Open 2005, Mar. 15, 2005, 478 pages.

* cited by examiner

*Primary Examiner* — Venkat Perungavoor

(57) ABSTRACT

Embodiments conceal or obfuscate tenancy in a multi-tenant cloud service participating in a federated identity platform. A cloud service receives a request for a document from a first entity. The request includes an identifier associated with a second entity. The identifier is compared to a set of tenant identifiers each corresponding to one of the tenants to determine whether the second entity is one of the tenants. Based on the determination, a fictitious response is generated and sent to the first entity. In some embodiments, the document conforms to identity management protocols such as the Security Assertion Markup Language (SAML) specification and the OpenID brand software.

19 Claims, 4 Drawing Sheets

MAINTAINING PRIVACY IN A MULTI-TENANT CLOUD SERVICE PARTICIPATING IN A FEDERATED IDENTITY PLATFORM

BACKGROUND

Many existing computing systems in an organization rely on centralized identity management systems. For example, user name and password information for a user is managed centrally within the organization. In contrast, some existing computing systems use federated identities. In a federated identity platform, an organization relies on an external trust provider (e.g., an identity provider) to manage authentication. Multiple organizations may participate in the federated identity platform. In such systems, documents describing the organizations participating in the federation are often publicly available (e.g., over a network). In this manner, organizations or other participants in the federation can learn about how to interact with other participants by accessing these documents. The documents include, for example, metadata documents conforming to the Security Assertion Markup Language (SAML) specification, and eXtensible Resource Descriptor Sequence (XRDS) documents conforming to the OpenID brand software.

In a cloud computing environment, multiple tenants share hardware and software resources to reduce costs and complexity while increasing performance and efficiency. For those multi-tenant public cloud service providers that participate in a federated identity system, the cloud service providers expose the metadata documents for each of the tenants of the cloud service provider. For example, an application executing by the cloud service provider may expose the metadata documents, via a uniform resource location (URL), to enable identity providers in the federation to poll the URL and update their configuration when the metadata documents change. A document URL corresponding to an organization that is not a tenant of the cloud service provider results in an error response (e.g., "file not found"). To maintain the privacy of the tenants, the existing systems are undesirable because they allow a third party to probe document URLs to test whether an organization has an account with the cloud service provider.

Some cloud service providers that participate in federated identity platforms require additional authentication to the cloud service provider before accessing the metadata documents. This requires the cloud service provider to maintain an authentication mechanism separate from, and in addition to, the authentication provided by the identity provider, thereby forcing a system administrator to manage multiple systems with authentication and identity policy spread across multiple software stacks. As a central goal of identity federation is to have authentication managed by the identity provider exclusively, the existing solutions for maintaining the privacy of tenants in such cloud service environments are inadequate.

SUMMARY

One or more embodiments described herein obfuscate tenancy in a multi-tenant cloud service participating in a federated identity platform. The cloud service receives a request for a document from a first entity. The request includes an identifier associated with a second entity. The cloud service compares the identifier to a set of tenant identifiers each corresponding to one of a plurality of tenants of the cloud service to determine whether the second entity is one of the plurality of tenants. A fictitious response is generated based on the determination and the generated fictitious response is sent to the first entity. In this manner, the cloud service obfuscates whether the second entity is one of the plurality of tenants.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
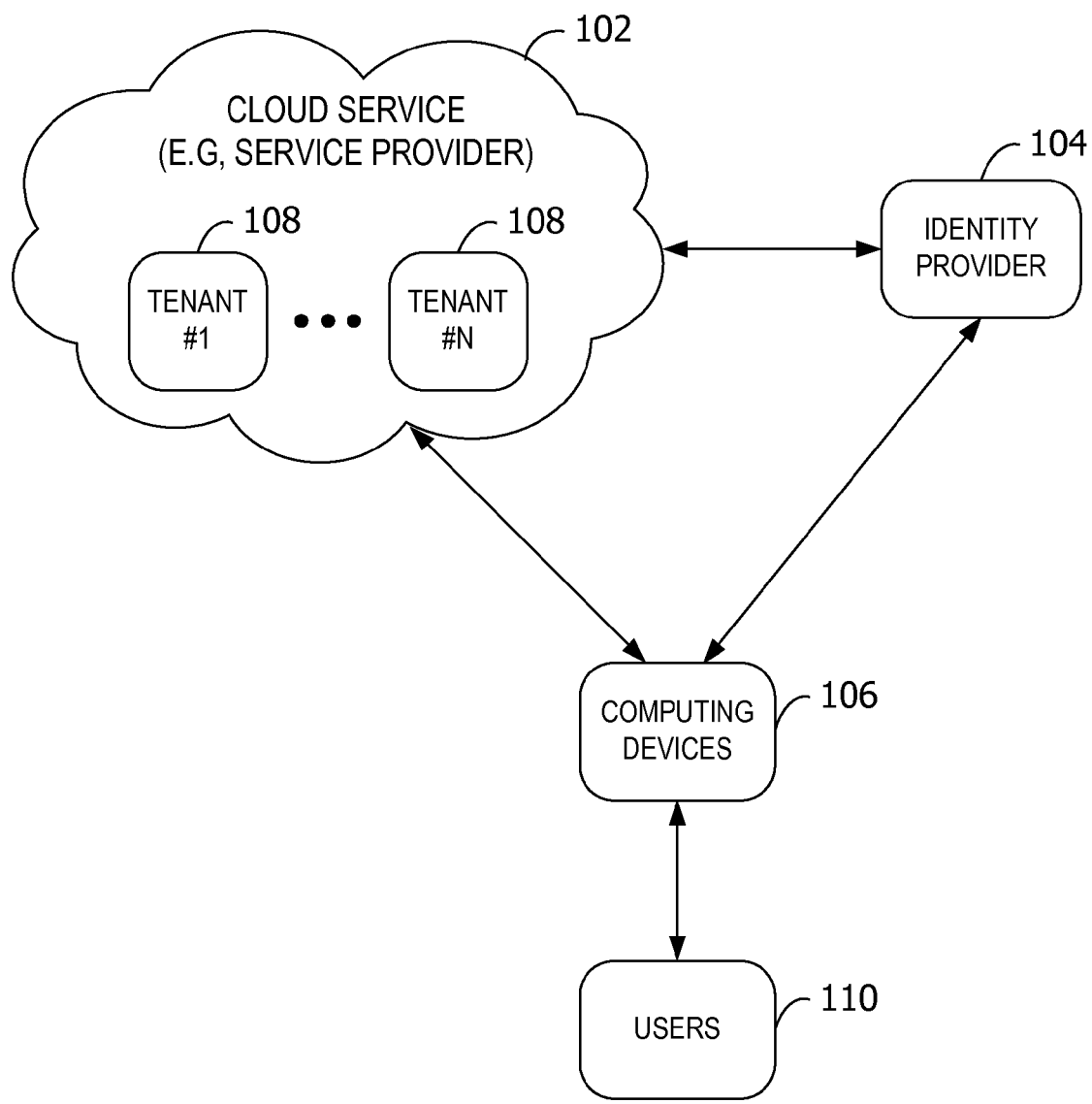
FIG. 1 is a block diagram of an exemplary multi-tenant cloud service participating in a federated identity platform.

Embodiments described herein obfuscate tenancy status in a multi-tenant cloud service 102 participating in a federated identity platform. In some embodiments, metadata documents describing entities that are not tenants 108 of cloud service 102 are dynamically generated with fictitious information to prevent third parties from ascertaining whether or not those entities are tenants 108.

In the federated identity platform, authentication is established via at least one identity provider 104. For example, a principal (e.g., a computing device 106) requests a service from a service provider (e.g., cloud service 102). The service provider obtains an identity assertion from identity provider 104 and provides the service to the principal based on the identity assertion. In cloud computing environments, federated identities provide single sign-on (SSO) support with other cloud applications, enterprise applications, service provider portals, etc. User management is also simplified, as authentication information is managed in a single location (e.g., identity provider 104), thus eliminating the need to manage authentication mechanisms in cloud service 102 itself.

Some embodiments support the Security Assertion Markup Language (SAML) metadata specification, which allows for an extensible markup language (XML) document with service metadata to be exposed at a particular uniform resource location (URL). In some embodiments, one metadata document is exposed for each tenant of cloud service 102 to enable independent configuration of tenant organizations. Each document is exposed at a URL that incorporates the name of the organization. However, the URL may incorporate any information, alternatively or in addition to the URL, that is unique among tenants 108. To prevent probing of tenants 108 by testing specific URLs for the metadata document, aspects of the disclosure dynamically expose a metadata document for an organization even when the organization name incorporated into the URL does not refer to one of tenants 108 hosted by cloud service 102. In addition to exposing the metadata document, aspects of the disclosure simulate, generate, or otherwise produce contents of the metadata document by including valid, yet fictitious, data. For example, cloud service 102 generates a signing key and public certificate in response to a request for a non-tenant's SAML metadata document so that the metadata document returned gives the impression to a third party of a valid tenant—without regard to whether the organization is one of tenants 108.

FIG. 1 is a block diagram of cloud service 102 participating in a federated identity platform. In the federated identity example of FIG. 1, one or more computing devices 106 communicate with cloud service 102 and identity provider 104. Cloud service 102 includes a plurality of tenants 108, such as tenant #1 through tenant #N, each representing an entity (e.g., a business entity). Cloud service 102 hosts resources such as services 210 and/or storage for tenants 108 and provides those resources to computing devices 106 on behalf of tenants 108.

Cloud service 102 communicates with identity provider 104 for authentication services (e.g., exchanges metadata). Identity provider 104 represents any entity providing such authentication services. For example, identity provider 104 authenticates a client or other user 110 and provides security information (e.g., a token) verifying the identity of the user 110 upon successful authentication. The security information is relied on by cloud service 102 or other party when providing services (e.g., services 210) to user 110.

Aspects of the disclosure are operable with any form, type, or kind of identity provider 104 for establishing trust between cloud service 102 and identity provider 104. Further, computing devices 106 and cloud service 102 are operable with any protocol or standard implementing identity services and/or other forms of authentication services. Aspects of the disclosure are operable with, for example, the SAML specification, the OpenID brand software, and others. Additional information describing SAML may be found in the OASIS standard for SAML V2.0, which is incorporated by reference herein and cited in an Information Disclosure Statement filed concurrently herewith.

In some embodiments, cloud service 102 is virtualized (e.g., is implemented using a plurality of virtual machines). An exemplary description of such a virtualized environment is described below with reference to FIG. 2.

Figure 2:
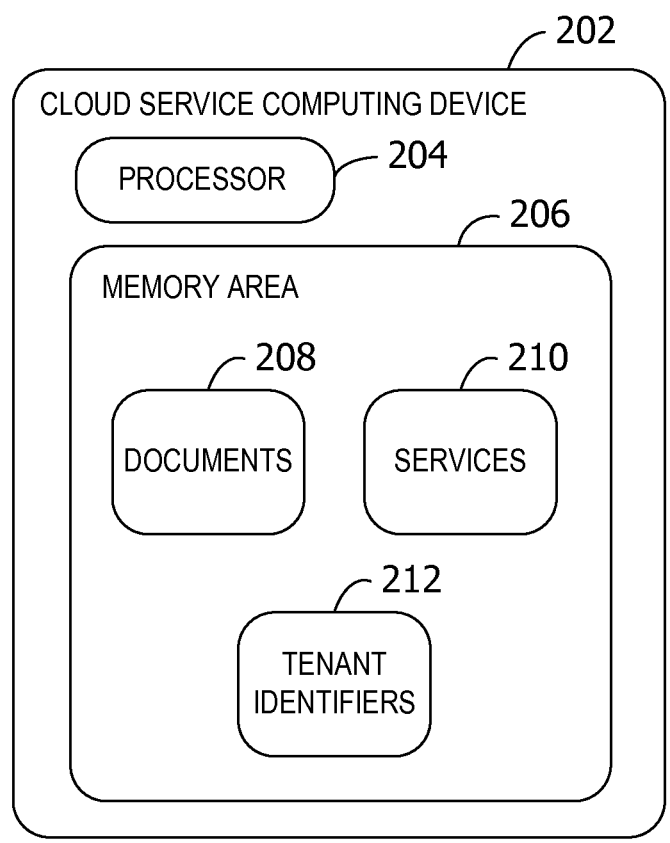
FIG. 2 is a block diagram of an exemplary cloud service computing device in the cloud service for implementing operations to prevent revealing whether entities are tenants of cloud service in a federated identity environment.

FIG. 2 is a block diagram of an exemplary cloud service computing device 202 in cloud service 102 for implementing operations to prevent revealing whether entities are tenants 108 of cloud service 102 in the federated identity environment illustrated in FIG. 1. For example, in a federated identity environment, cloud service 102 conceals, obfuscates, or otherwise attempts to prevent revealing whether a particular entity is a tenant (e.g., customer) of cloud service 102.

Cloud service computing device 202 represents any device executing instructions (e.g., as application programs, operating system functionality, or both) to implement operations and functionality such as illustrated and described with reference to FIG. 3. Cloud service computing device 202 may include any computing device or processing unit. For example, cloud service computing device 202 may represent a group of processing units or other computing devices.

Cloud service computing device 202 has at least one processor 204 and a memory area 206. Processor 204 includes any quantity of processing units, and is programmed to execute computer-executable instructions for implementing aspects of the disclosure. The instructions may be performed by processor 204 or by multiple processors executing within cloud service computing device 202, or performed by a processor external to cloud service computing device 202. In some embodiments, processor 204 is programmed to execute instructions such as those illustrated in the figures.

Memory area 206 includes any quantity of computer-readable media associated with or accessible by cloud service computing device 202. Memory area 206, or portions thereof, may be internal to cloud service computing device 202, external to cloud service computing device 202, or both. Memory area 206 allows information, such as executable instructions and/or other data, to be stored and retrieved. For example, memory area 206 may include one or more random access memory (RAM) modules, flash memory modules, hard disks, solid state disks, and/or optical disks.

In the example of FIG. 2, memory area 206 stores documents 208, services 210, and/or other resources, some of which are hosted by cloud service computing device 202 on behalf of one or more of tenants 108. Documents 208 includes, for example, metadata documents generated for use with aspects of the disclosure. In other embodiments, however, the documents generated as described with reference to FIG. 3 are not stored for future use, but rather generated dynamically or on-the-fly as needed.

Memory area 206 further stores a set of tenant identifiers 212, each corresponding to one of tenants 108 in some embodiments. Exemplary tenant identifiers 212 are represented by alphabetic, numeric, alphanumeric, and/or other forms of values.

Cloud service computing device 202 may further have additional components and/or modules not shown in FIG. 2. For example, cloud service computing device 202 may include a network communication interface, which enables cloud service computing device 202 to communicate with a remote device (e.g., another computing device) via a communication medium, such as a wired or wireless packet network. For example, cloud service computing device 202 may transmit and/or receive data via the network communication interface.

Cloud service computing device 202 may further include a storage interface that enables cloud service computing device 202 to communicate with one or more datastores, which store virtual disk images, software applications, and/or any other data suitable for use with the methods described herein. In exemplary embodiments, the storage interface couples cloud service computing device 202 to a storage area network (SAN) (e.g., a Fibre Channel network) and/or to a network-attached storage (NAS) system (e.g., via a packet network). The storage interface may be integrated with the network communication interface.

In a virtualized embodiment, cloud service computing device 202 may further have one or more virtual machines that are instantiated on cloud service computing device 202. A virtualization software layer, also referred to hereinafter as a hypervisor, is installed on top of a hardware platform in cloud service computing device 202.

The virtualization software layer supports a virtual machine execution space within which multiple virtual machines may be concurrently instantiated and executed. In some embodiments, the hypervisor includes a device driver layer, and maps physical resources of the hardware platform (e.g., processor 204, memory area 206, the network communication interface, and/or the user interface device) to "virtual" resources of each of VMs such that each of the VMs has its own virtual hardware platform. Each virtual hardware platform has its own emulated hardware. The hypervisor may manage (e.g., monitor, initiate, and/or terminate) execution of the VMs according to policies associated with the hypervisor, such as a policy specifying that the VMs are to be automatically restarted upon unexpected termination and/or upon initialization of the hypervisor. In addition, or alternatively, the hypervisor may manage execution of the VMs based on requests received from a device other than cloud service computing device 202. For example, the hypervisor may receive an execution instruction specifying the initiation of execution of one of the VMs from a management device via the network communication interface and execute the execution instruction to initiate execution of the VM.

In some embodiments, cloud service computing device 202 includes a virtual disk that is associated with or "mapped to" one or more virtual disk images stored on a disk (e.g., a hard disk or solid state disk) of cloud service computing device 202. The virtual disk image represents a file system (e.g., a hierarchy of directories and files) used by the VMs in a single file or in a plurality of files, each of which includes a portion of the file system. In addition, or alternatively, virtual disk images may be stored on one or more remote computing devices, such as in a storage area network (SAN) configuration. In such embodiments, any quantity of the virtual disk images may be stored by the remote computing devices.

The device driver layer includes, for example, a communication interface driver that interacts with the network communication interface to receive and transmit data from, for example, a local area network (LAN) connected to cloud service computing device 202. The communication interface driver also includes a virtual bridge that simulates the broadcasting of data packets in a physical network received from one communication interface (e.g., the network communication interface) to other communication interfaces (e.g., the virtual communication interfaces of the VMs). Each virtual communication interface for each VM may be assigned a unique virtual Media Access Control (MAC) address that enables the virtual bridge to simulate the forwarding of incoming data packets from the network communication interface. In an embodiment, the network communication interface is an Ethernet adapter that is configured in "promiscuous mode" such that all Ethernet packets that it receives (rather than just Ethernet packets addressed to its own physical MAC address) are passed to the virtual bridge, which, in turn, is able to further forward the Ethernet packets to the VMs. This configuration enables an Ethernet packet that has a virtual MAC address as its destination address to properly reach the VM in cloud service computing device 202 with a virtual communication interface that corresponds to such virtual MAC address.

The virtual hardware platform may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as a guest operating system (OS) to execute applications for an instantiated VM. The virtual hardware platforms may be considered to be part of virtual machine monitors (VMMs) that implement virtual system support to coordinate operations between the hypervisor and the corresponding VMs. Those with ordinary skill in the art will recognize that the various terms, layers, and categorizations used to describe the virtualization components may be referred to differently without departing from their functionality or the spirit or scope of the disclosure. For example, the virtual hardware platforms may also be considered to be separate from the VMMs, and the VMMs may be considered to be separate from the hypervisor. One example of the hypervisor that may be used in an embodiment of the disclosure is included as a component in VMware's ESX brand software, which is commercially available from VMware, Inc.

Figure 3:
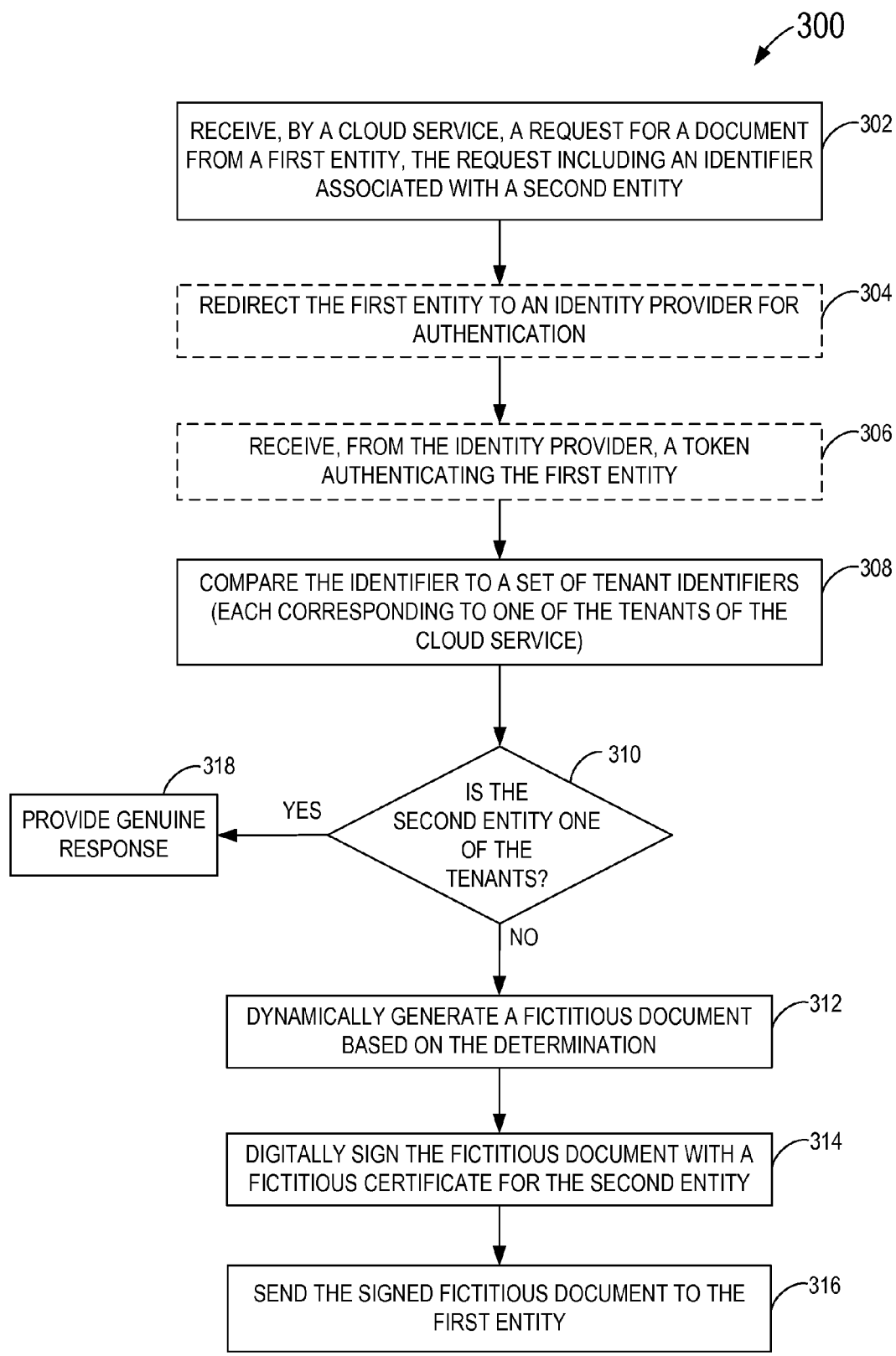
FIG. 3 is a flowchart of an exemplary method performed by cloud service to conceal the tenancy status of entities hosted by cloud service.

FIG. 3 is a flowchart of an exemplary method performed by cloud service 102 to conceal the tenancy status of entities hosted by cloud service 102. While method 300 is described with reference to execution by cloud service 102 (e.g., cloud service computing device 202), it is contemplated that method 300 may be performed by any computing device. For example, method 300 may be performed by a computing device separate from cloud service 102.

At 302, cloud service 102 receives a request for a document from a first entity. The request includes an identifier associated with a second entity. For example, the identifier includes a name of the entity (e.g., a business or company name). In the example of FIG. 3, cloud service 102 participates in a federated identity platform and has a plurality of tenants 108. In some embodiments, the request is a hypertext transfer protocol (HTTP) request with a URL. The URL includes a company name as the identifier for the second entity. An exemplary URL may be shown as <<https://cloud/ORGANIZATION-NAME/sam1/metadata>>, where ORGANIZATION-NAME corresponds to the company name.

In some embodiments, the first entity is unaffiliated with the second entity. For example, the first entity may be probing cloud service 102, via the request, to determine whether the second entity is one of tenants 108 of cloud service 102. In other embodiments, however, the first entity may be the second entity probing for cloud service 102 to confirm tenancy status and/or to obtain information about an account of the second entity with cloud service 102.

In response to receiving the request, cloud service 102 determines whether the first entity has already been authenticated. For example, cloud service 102 checks memory area 206 to see if valid security information (e.g., a token) or other security context for the first entity (e.g., user 110 and/or device 106) has been previously received by cloud service 102. If valid security information is not available to cloud service 102, cloud service 102 redirects the first entity to identity provider 104 to authenticate a federated identity for the first entity at 304. In response to successful authentication of the first entity by identity provider 104, cloud service 102 receives a token or other security information authenticating the first entity at 306. For example, the token may include a single sign-on (SSO) token.

If valid security information is already available to cloud service 102, operations 304, 306 are not performed.

In this manner, the operations illustrated in FIG. 3 are performed by cloud service 102 without cloud service 102 performing authentication of the first entity. For example, receiving the request, comparing the identifier, generating the fictitious document, and sending the fictitious document to the first entity occur without cloud service 102 performing authentication of the first entity.

Further, in some embodiments, the first entity does not need to be authenticated. Those skilled in the art will note that while some aspects of the disclosure are described in the context of authenticating the first entity via identity provider 104, some embodiments are operable without redirecting the first entity to identity provider 104. In some of those embodiments, any request to cloud service 102 for a document relating to a non-tenant results in cloud service 102 providing fictitious data in response.

Cloud service 102 extracts or parses the identifier from the received request. At 308, cloud service 102 compares the identifier from the received request to the set of tenant identifiers 212, where each tenant identifier 212 corresponds to one of tenants 108, to determine at 310 whether the second entity is one of tenants 108. For example, cloud service 102 compares a business name to businesses who are tenants 108 of cloud service 102. If the second entity is not one of tenants 108 (e.g., on determining that the second entity is not one of tenants 108), cloud service 102 dynamically generates a fictitious document at 312 (e.g., a fictitious version). For example, cloud service 102 generates a response that appears to contain valid data describing the second entity in response to the request. In some embodiments, cloud service 102 generates a fictitious response that conforms to the SAML specification or other authentication service or protocol.

At 314, cloud service 102 digitally signs the generated fictitious document with a certificate or key (e.g., associated with the second entity), thereby increasing the appearance of validity of the document to the first entity. In some embodiments, cloud service 102 further creates the certificate or key for use in digitally signing. At 316, cloud service 102 sends the generated fictitious document to the first entity. The sent document is fictitious at least because it appears (to the first entity) to include data describing one of tenants 108 of cloud service 102. For example, the document appears to represent genuine, authentic, or valid data describing the second entity as one of tenants 108 of cloud service 102. The first entity is unable to determine, from the sent document, whether or not the second entity is really one of tenants 108 of cloud service 102. In this manner, aspects of the disclosure obfuscate, conceal, or otherwise hide, from the first entity, the tenancy status of the second entity (e.g., that the second entity is actually not one of tenants 108 of cloud service 102).

At 318, if the second entity is determined to be one of tenants 108 of cloud service 102, cloud service 102 provides a document that includes genuine, authentic, or valid data describing the second entity. In this instance, the second entity is one of tenants 108, so cloud service 102 includes up-to-date and accurate data corresponding to the second entity.

In some embodiments, one or more computer-readable storage media include computer-executable instructions that, when executed, cause processor 204 to perform one or more of the operations illustrated in FIG. 3. In this manner, aspects of the disclosure operate to conceal tenancy in cloud service 102 that participates in a federated identity platform.

Figure 4:
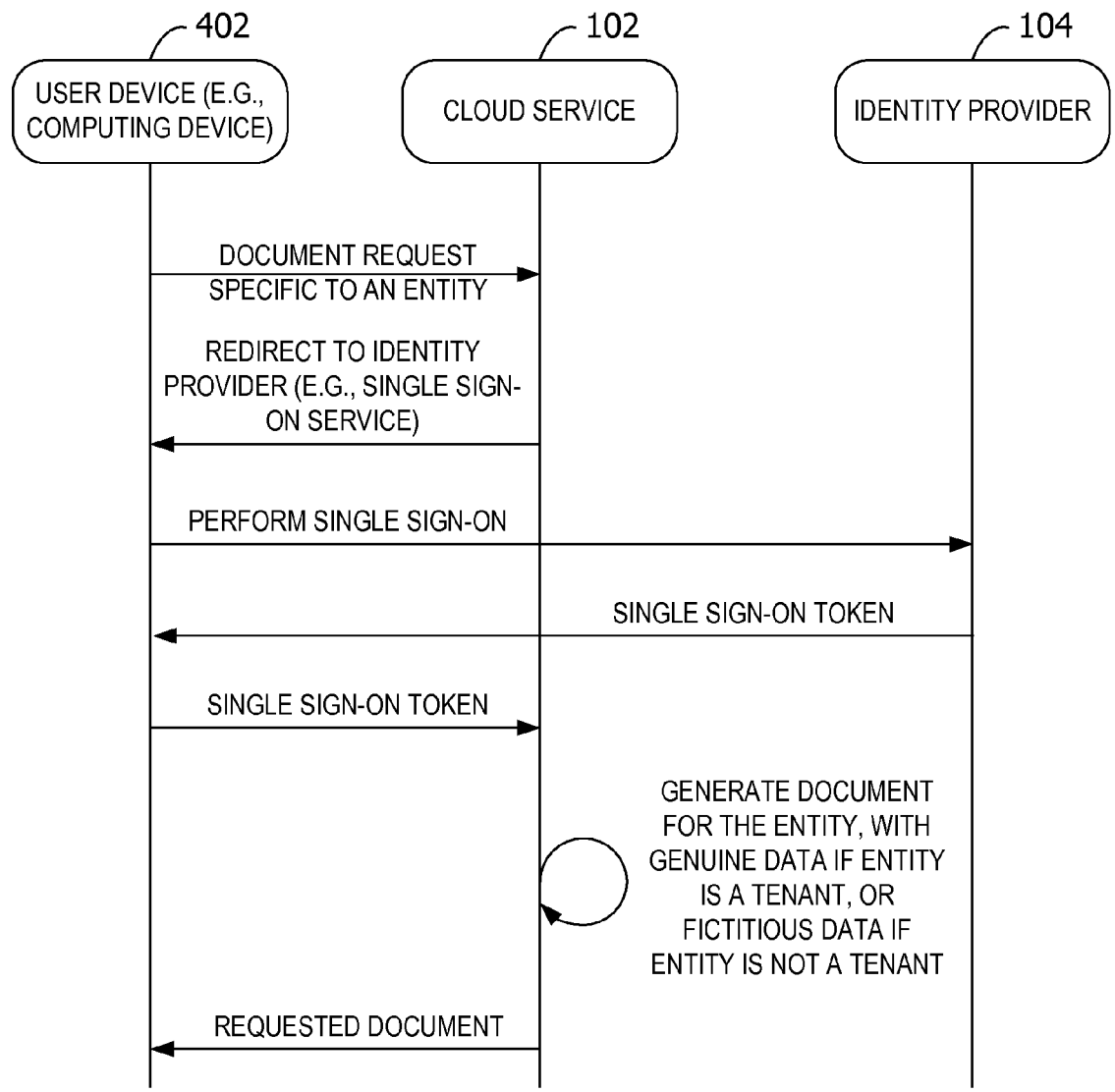
FIG. 4 is a sequence diagram illustrating communication among a user device, the cloud service (e.g., service provider), and an identity provider in a federated identity platform.

FIG. 4 is a sequence diagram illustrating communication among a user device 402, cloud service 102 (e.g., service provider), and identity provider 104 in a federated identity platform. Cloud service 102 responds to requests from user device 402. For example, user device 402 requests a document relating to a particular or specific entity that may or may not be one of tenants 108 of cloud service 102. If an authenticated session is not established (e.g., there is no authenticated token accessible to cloud service 102), cloud service 102 redirects user device 402 to identity provider 104 (e.g., or one of identity providers 104 available in the federated identity platform). For example, user device 402 is redirected to a URL of identity provider 104. User device 402 communicates with identity provider 104 to complete authentication. For example, user device 402 performs SSO with identity provider 104.

After successfully authenticating user device 402 (e.g., receiving correct user name and password information), identity provider 104 sends security information to user device 104. User device 104 then sends the security information to cloud service 102 to indicate successful authentication of user device 402. In one example, identity provider 104 generates a SAML token to create an authenticated session for user device 402, and sends the SAML token to an HTTP endpoint of user device 402 that accepts tokens. In another example, identity provider 104 sends the SAML token directly to an HTTP endpoint of cloud service 102. Once the authenticated session is established by identity provider 104, future requests from user device 402 do not involve redirection of user device 402 to identity provider 104. Further, the token is available to other relying parties (e.g., in addition to cloud service 102) that use the same identity provider 104 or service.

In response to receiving the token, cloud service 102 verifies a digital signature of the SAML token. If the entity that is the subject of the request from user device 402 is one of tenants 108, cloud service 102 generates a document containing genuine or otherwise authentic data for the entity. If the entity is not one of tenants 108, cloud service 102 generates a document containing fictitious data for the entity. Cloud service 102 then provides the generated document to user device 402.

ADDITIONAL EXAMPLES

The following scenarios are merely exemplary and not intended to be limiting in any way.

Appendix A includes a sample SAML response from cloud service 102 generated in response to receiving a request from the first entity (e.g., user device 402) for the second entity that is one of tenants 108 of cloud service 102. The sample SAML response is represented as a document with the name "real_tenant.xml". In this example, the name of tenant is "development" and shown in the URL in the document.

Appendix B includes a sample SAML response from cloud service 102 generated in response to receiving a request from the first entity (e.g., user device 402) for the second entity that is not one of tenants 108 of cloud service 102. The sample SAML response is represented as a document with the name "fake_tenant.xml". In this example, the name of tenant is "nonexistentorg" and shown in the URL in the document. The document includes a valid SAML metadata response (e.g., conforming to the SAML specification), complete with valid URLs (e.g., URLS that will themselves respond correctly as per the SAML specification), a digital certificate, and other policy settings (e.g., the kind of user names supported: "Name ID formats").

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for simulating an authentication workflow with federated identities to prevent probing for tenants 108 of cloud service 102.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

APPENDIX A

Listed below is a sample SAML response generated by cloud service 102. In this example, the first entity is requesting information about the second entity that is actually one of tenants 108 of cloud service 102.

```
<?xml version="1.0" encoding="UTF-8"?>
<md:EntityDescriptor xmlns:md="urn:oasis:names:tc:SAML:2.0:metadata"
entityID="https://cloud/org/development/saml/metadata/alias/cloud">
<md:SPSSODescriptor
protocolSupportEnumeration="urn:oasis:names:tc:SAML:2.0:protocol"
WantAssertionsSigned="true" AuthnRequestsSigned="true">
<md:KeyDescriptor use="signing">
<ds:KeyInfo xmlns:ds="http://www.w3.org/2000/09/xmldsig#">
<ds:X509Data><ds:X509Certificate>MIIB3TCCAUagAwIBAgIEa6vPRTANBgkqhki
G9w0BAQUFADAzMTEwLwYDVQQDEyh2Q2xvdWQgRGlyZWN0b3Igb3JnYW5pemF0aW9uIEN
lcnRpZmljYXRlMB4XDTEzMDExMjIzNDY1OVoXDTE0MDExMjIzNDY1OVowMzExMC8GA1U
EAxModkNsb3VkIERpcmVjdG9yIG9yZ2FuaXphdGlvbiBDZXJ0aWZpY2F0ZTCBnzANBgk
qhkiG9w0BAQEFAAOBjQAwgYkCgYEAhzgPMjKoFgNGTmX7jkldkyhvHi9begkesuCvOcg
QX2x21QD32l2hb1AItljLkwEC9BSjBNhdiywMUGhVhWPLTM2amdfpnir2hJKaEtwwjzK
d0hMSfeX2NKsYbDVahuORr8XsxJOkCV1FyU/8Gu18JunSvZ3UB0FucxqO7X8vnf8CAwE
AATANBgkqhkiG9w0BAQUFAAOBgQAF9htaq7V3BmAoFIQauzaLhdTbpy+J330Zp4pPriS
JE8dCaM2BzdLlqbJt1MVnTv8t5tXEkyMOlcroMGq9M7weKn7XoFnTdmFx2hBoS78msck
7GOXO6ockdxaViOaA87qP8v5+KncZuqWtNk/q5fFbAEPbyw3TJmMHofII5ibUYA==</
ds:X509Certificate></ds:X509Data>
</ds:KeyInfo>
</md:KeyDescriptor>
```

APPENDIX A-continued

Listed below is a sample SAML response generated by cloud service 102. In this example, the first entity is requesting information about the second entity that is actually one of tenants 108 of cloud service 102.

```
<md:KeyDescriptor use="encryption">
<ds:KeyInfo xmlns:ds="http://www.w3.org/2000/09/xmldsig#">
<ds:X509Data><ds:X509Certificate>MIIB3TCCAUagAwIBAgIEa6vPRTANBgkqhki
G9w0BAQUFADAzMTEwLwYDVQQDEyh2Q2xvdWQgRGlyZWN0b3Igb3JnYW5pemF0aW9uIEN
lcnRpZmljYXRlMB4XDTEzMDExMjIzNDY1OVoXDTE0MDExMjIzNDY1OVowMzExMC8GA1U
EAxModkNsb3VkIERpcmVjdG9yIG9yZ2FuaXphdGlvbiBDZXJ0aWZpY2F0ZTCBnzANBgk
qhkiG9w0BAQEFAAOBjQAwgYkCgYEAhzgPMjKoFgNGTmX7jkldkyhvHi9begkesuCvOcg
QX2x21QD32l2hb1AItljLkwEC9BSjBNhdiywMUGhVhWPLTM2amdfpnir2hJKaEtwwjzK
d0hMSfeX2NKsYbDVahuORr8XsxJOkCV1FyU/8Gu18JunSvZ3UB0FucxqO7X8vnf8CAwE
AATANBgkqhkiG9w0BAQUFAAOBgQAF9htaq7V3BmAoFIQauzaLhdTbpy+J330Zp4pPriS
JE8dCaM2BzdLlqbJt1MVnTv8t5tXEkyMOlcroMGq9M7weKn7XoFnTdmFx2hBoS78msck
7GOXO6ockdxaViOaA87qP8v5+KncZuqWtNk/q5fFbAEPbyw3TJmMHoflI5ibUYA==</
ds:X509Certificate></ds:X509Data>
</ds:KeyInfo>
</md:KeyDescriptor>
<md:SingleLogoutService
Location="https://cloud/org/development/saml/SingleLogout/alias/cloud"
Binding="urn:oasis:names:tc:SAML:2.0:bindings:HTTP-POST"/>
<md:SingleLogoutService
Location="https://cloud/org/development/saml/SingleLogout/alias/cloud"
Binding="urn:oasis:names:tc:SAML:2.0:bindings:HTTP-Redirect"/>
<md:SingleLogoutService
Location="https://cloud/org/development/saml/SingleLogout/alias/cloud"
Binding="urn:oasis:names:tc:SAML:2.0:bindings:SOAP"/>
<md:NameIDFormat>urn:oasis:names:tc:SAML:1.1:nameid-
format:emailAddress</md:NameIDFormat>
<md:NameIDFormat>urn:oasis:names:tc:SAML:2.0:nameid-
format:transient</md:NameIDFormat>
<md:NameIDFormat>urn:oasis:names:tc:SAML:2.0:nameid-
format:persistent</md:NameIDFormat>
<md:NameIDFormat>urn:oasis:names:tc:SAML:1.1:nameid-
format:unspecified</md:NameIDFormat>
<md:NameIDFormat>urn:oasis:names:tc:SAML:1.1:nameid-
format:X509SubjectName</md:NameIDFormat>
<md:AssertionConsumerService
Location="https://cloud/org/development/saml/SSO/alias/cloud"
Binding="urn:oasis:names:tc:SAML:2.0:bindings:HTTP-POST"
isDefault="true" index="0"/>
<md:AssertionConsumerService
Location="https://cloud/org/development/saml/HoKSSO/alias/cloud"
Binding="urn:oasis:names:tc:SAML:2.0:profiles:holder-of-
key:SSO:browser" index="1"
xmlns:hoksso="urn:oasis:names:tc:SAML:2.0:profiles:holder-of-
key:SSO:browser"
hoksso:ProtocolBinding="urn:oasis:names:tc:SAML:2.0:bindings:HTTP-
POST"/>
</md:SPSSODescriptor>
</md:EntityDescriptor>
```

APPENDIX B

Listed below is a sample SAML response generated by cloud service 102. In this example, the first entity is requesting information about the second entity that is not one of tenants 108 of cloud service 102.

```
<?xml version="1.0" encoding="UTF-8"?>
<md:EntityDescriptor xmlns:md="urn:oasis:names:tc:SAML:2.0:metadata"
entityID="https://cloud:443/org/nonexistentorg/saml/metadata/alias/cloud">
<md:SPSSODescriptor
protocolSupportEnumeration="urn:oasis:names:tc:SAML:2.0:protocol"
WantAssertionsSigned="true" AuthnRequestsSigned="true">-
<md:KeyDescriptor use="signing">
<ds:KeyInfo xmlns:ds="http://www.w3.org/2000/09/xmldsig#">
<ds:X509Data><ds:X509Certificate>MIIB3TCCAUagAwIBAgIEWA6fMzANBgkqhki
G9w0BAQUFADAzMTEwLwYDVQQDEyh2Q2xvdWQgRGlyZWN0b3Igb3JnYW5pemF0aW9uIEN
lcnRpZmljYXRlMB4XDTEzMDQwMTAyMzkyNloXDTE0MDQwMTAyMzkyNlowMzExMC8GA1U
EAxModkNsb3VkIERpcmVjdG9yIG9yZ2FuaXphdGlvbiBDZXJ0aWZpY2F0ZTCBnzANBgk
qhkiG9w0BAQEFAAOBjQAwgYkCgYEAjdMFNoLnpqAHZvmcnloaQJTPkWDk7GlwCkgv2da
YqtHdABBfLJTP3L5VGEvmrnDg0Ikyb++WLGaR/CTe0gLQUkeKa6UvcUKM91cE/m8yO4V
3kdEDZ1vVJ2CIe4HglunR6EHgPOG/1Mrr57G3q0sR0rdr+epTmorehUE2KM2k2LECAwE
AATANBgkqhkiG9w0BAQUFAAOBgQB0dfiS4z6tCLOS1sx58KxhbmgkLm0poknzb57TddB
6UxBzLALvtV9xBglhnpORqVIV7GEHAYIWegKrJdtegp3m4BvGT/Sxx7OrR5GaF8PU+6Q
psrbgPLAolWdAG5ep41D2LnCbEFQaZIo1wANK/Mv93YA9TAorN7K3FfNSqRrQKA==</
```

APPENDIX B-continued

Listed below is a sample SAML response generated by cloud service 102. In this example, the first entity is requesting information about the second entity that is not one of tenants 108 of cloud service 102.

```
ds:X509Certificate></ds:X509Data>
</ds:KeyInfo>
</md:KeyDescriptor>
<md:KeyDescriptor use="encryption">
<ds:KeyInfo xmlns:ds="http://www.w3.org/2000/09/xmldsig#">
<ds:X509Data><ds:X509Certificate>MIIB3TCCAUagAwIBAgIEWA6fMzANBgkqhki
G9w0BAQUFADAzMTEwLwYDVQQDEyh2Q2xvdWQgRGlyZWN0b3Igb3JnYW5pemF0aW9uIEN
lcnRpZmljYXRlMB4XDTEzMDQwMTAyMzkyNloXDTE0MDQwMTAyMzkyNlowMzExMC8GA1U
EAxModkNsb3VkIERpcmVjdG9yIG9yZ2FuaXphdGlvbiBDZXJ0aWZpY2F0ZTCBnzANBgk
qhkiG9w0BAQEFAAOBjQAwgYkCgYEAjdMFNoLnpqAHZvmcnloaQJTPkWDk7GlwCkgv2da
YqtHdABBfLJTP3L5VGEvmrnDg0Ikyb++WLGaR/CTe0gLQUkeKa6UvcUKM91cE/m8yO4V
3kdEDZ1vVJ2CIe4HglunR6EHgPOG/1Mrr57G3q0sR0rdr+epTmorehUE2KM2k2LECAwE
AATANBgkqhkiG9w0BAQUFAAOBgQB0dfiS4z6tCLOS1sx58KxhbmgkLm0poknzb57TddB
6UxBzLALvtV9xBglhnpORqVIV7GEHAYIWegKrJdtegp3m4BvGT/Sxx7OrR5GaF8PU+6Q
psrbgPLAolWdAG5ep41D2LnCbEFQaZIo1wANK/Mv93YA9TAorN7K3FfNSqRrQKA==</
ds:X509Certificate></ds:X509Data>
</ds:KeyInfo>
</md:KeyDescriptor>
<md:SingleLogoutService
Location="https://cloud:443/org/nonexistentorg/saml/SingleLogout/alias/
cloud" Binding="urn:oasis:names:tc:SAML:2.0:bindings:HTTP-POST"/>
<md:SingleLogoutService
Location="https://cloud:443/org/nonexistentorg/saml/SingleLogout/alias/
cloud" Binding="urn:oasis:names:tc:SAML:2.0:bindings:HTTP-
Redirect"/>
<md:SingleLogoutService
Location="https://cloud:443/org/nonexistentorg/saml/SingleLogout/alias/
cloud" Binding="urn:oasis:names:tc:SAML:2.0:bindings:SOAP"/>
<md:NameIDFormat>urn:oasis:names:tc:SAML:1.1:nameid-
format:emailAddress</md:NameIDFormat>
<md:NameIDFormat>urn:oasis:names:tc:SAML:2.0:nameid-
format:transient</md:NameIDFormat>
<md:NameIDFormat>urn:oasis:names:tc:SAML:2.0:nameid-
format:persistent</md:NameIDFormat>
<md:NameIDFormat>urn:oasis:names:tc:SAML:1.1:nameid-
format:unspecified</md:NameIDFormat>
<md:NameIDFormat>urn:oasis:names:tc:SAML:1.1:nameid-
format:X509SubjectName</md:NameIDFormat>
<md:AssertionConsumerService
Location="https://cloud:443/org/nonexistentorg/saml/SSO/alias/cloud"
Binding="urn:oasis:names:tc:SAML:2.0:bindings:HTTP-POST"
isDefault="true" index="0"/>
<md:AssertionConsumerService
Location="https://cloud:443/cloud/org/nonexistentorg/saml/HoKSSO/alias/
cloud" Binding="urn:oasis:names:tc:SAML:2.0:profiles:holder-of-
key:SSO:browser" index="1"
xmlns:hoksso="urn:oasis:names:tc:SAML:2.0:profiles:holder-of-
key:SSO:browser"
hoksso:ProtocolBinding="urn:oasis:names:tc:SAML:2.0:bindings:HTTP-
POST"/>
</md:SPSSODescriptor>
</md:EntityDescriptor>
```

We claim:

1. A system for concealing tenancy in a multi-tenant cloud service relying on federated identities, said system comprising:
    a memory area associated with a cloud service, said memory area storing a set of tenant identifiers each corresponding to one of a plurality of tenants of the cloud service; and
    a processor programmed to:
        receive a request for a document from a first entity by the cloud service, the request including an identifier associated with a second entity;
        receive, from an identity provider, a token authenticating the first entity;
        compare the identifier to a set of tenant identifiers each corresponding to one of the plurality of tenants to determine whether the second entity is one of the plurality of tenants;
        dynamically generate a fictitious document in response to the request after determining that the second entity is not one of the plurality of tenants;
        digitally sign the generated fictitious document with a certificate for the second entity; and
        send the signed fictitious document to the first entity.

2. The system of claim 1, wherein the fictitious document includes valid data.

3. The system of claim 1, wherein the processor is further programmed to, in response to receiving the request, redirect the first entity to the identity provider to authenticate a federated identity for the first entity.

4. The system of claim 1, wherein the first entity is unaffiliated with the second entity, and wherein the signed fictitious document appears, to the first entity, to represent the second entity as one of the plurality of tenants.

5. The system of claim 1, wherein the cloud service provides services and/or storage for each of the plurality of tenants.

6. The system of claim 1, wherein the processor is further programmed to generate a digital key for use in digitally signing the generated fictitious document.

7. The system of claim 1, further comprising means for simulating an authentication workflow with federated identities to prevent probing for the tenants of the cloud service.

8. A method comprising:
receiving a request for a document from a first entity by a cloud service participating in a federated identity platform, the request including an identifier associated with a second entity, the cloud service having a plurality of tenants;
comparing the identifier to a set of tenant identifiers each corresponding to one of the plurality of tenants to determine whether the second entity is one of the plurality of tenants;
generating a fictitious response in response to the request based on the determination; and
sending the generated fictitious response to the first entity, thereby obfuscating whether the second entity is one of the plurality of tenants,
wherein the process of generating the fictitious response comprises:
generating a certificate;
generating a fictitious version of the document; and
digitally signing the generated fictitious version of the document using the generated certificate.

9. The method of claim 8, wherein receiving the request comprises receiving a uniform resource locator (URL).

10. The method of claim 8, wherein generating the fictitious response based on the determination comprises generated the fictitious response on determining that the second entity is not one of the plurality of tenants.

11. The method of claim 8, wherein generating the fictitious response comprises generating a fictitious response in accordance with a security assertion markup language.

12. The method of claim 8, wherein generating the fictitious response comprises generating a fictitious response in accordance with an authentication protocol.

13. The method of claim 8, further comprising extracting the identifier from the received request.

14. The method of claim 8, wherein the identifier corresponds to a company.

15. The method of claim 8, wherein said receiving, said comparing, said generating, and said sending occur without the cloud service performing authentication of the first entity.

16. One or more computer-readable storage media including computer-executable instructions that, when executed, cause at least one processor to conceal tenancy in a multi-tenant cloud service participating in a federated identity platform by:
receiving a request for a document from a first entity by the cloud service, the request including an identifier associated with a second entity;
redirecting the first entity to an identity provider for authentication;
receiving a token from the identity provider indicating authentication of the first entity by the identity provider;
comparing the identifier to a set of tenant identifiers each corresponding to one of a plurality of tenants to determine whether the second entity is one of the plurality of tenants;
dynamically generating a fictitious document in response to the request after determining that the second entity is not one of the plurality of tenants;
digitally signing the generated fictitious document with a certificate for the second entity; and
sending the signed fictitious document to the first entity.

17. The computer storage media of claim 16, wherein receiving the token comprises receiving a single sign-on (SSO) token.

18. The computer storage media of claim 16, wherein the identifier comprises a business name, and wherein comparing the identifier to the set of tenant identifiers comprises comparing the business name to businesses who are tenants of the cloud service.

19. The computer storage media of claim 16, wherein the computer-executable instructions cause the processor to generate the fictitious document by dynamically producing data describing the second entity.

* * * * *